(12) United States Patent
Horvath et al.

(10) Patent No.: US 8,194,572 B2
(45) Date of Patent: Jun. 5, 2012

(54) METHOD AND APPARATUS FOR INCREASING PERFORMANCE OF A WIRELESS COMMUNICATION SYSTEM

(75) Inventors: Robert Horvath, Arlington Heights, IL (US); Troy Dixler, Deerfield, IL (US); Mark L. Shaughnessy, Phoenix, AZ (US)

(73) Assignee: Motorola Mobility, Inc., Libertyville, IL (US)

( * ) Notice: Subject to any disclaimer, the term of this patent is extended or adjusted under 35 U.S.C. 154(b) by 119 days.

(21) Appl. No.: 12/484,329

(22) Filed: Jun. 15, 2009

(65) Prior Publication Data

US 2010/0315971 A1 Dec. 16, 2010

(51) Int. Cl.
*H04L 12/28* (2006.01)
(52) U.S. Cl. .............. 370/254; 370/329; 455/452.2
(58) Field of Classification Search .................. None
See application file for complete search history.

(56) References Cited

U.S. PATENT DOCUMENTS

| | | | |
|---|---|---|---|
| 6,798,743 B1 | 9/2004 | Ma et al. | |
| 6,947,996 B2 | 9/2005 | Assa et al. | |
| 7,162,540 B2 | 1/2007 | Jasen et al. | |
| 7,322,044 B2 | 1/2008 | Hrastar | |
| 7,346,000 B1 | 3/2008 | Srinivasan et al. | |
| 2006/0236393 A1* | 10/2006 | Kramer et al. | 726/23 |
| 2007/0294698 A1* | 12/2007 | Thoelke et al. | 718/104 |
| 2009/0296630 A1* | 12/2009 | Chen et al. | 370/328 |
| 2010/0008292 A1* | 1/2010 | Ludwig et al. | 370/328 |
| 2010/0067400 A1* | 3/2010 | Dolganow et al. | 370/253 |

OTHER PUBLICATIONS

Blake, S. et al.: "An Architecture for Differentiated Services", Network Working Group, Request for Comments: RFC 247, Category: Informational, Dec. 1998, Section 2.3.3.

* cited by examiner

*Primary Examiner* — Gregory Sefcheck
*Assistant Examiner* — Minh-Trang Nguyen

(57) ABSTRACT

A method for increasing performance of a wireless communication system is provided. The method includes determining (220) quality of service parameters that will result in a reduced likelihood that an application assigned the determined quality of service parameters will be scheduled for transmission, identifying (230) an application to be provided service that is less than best effort, and assigning (240) the determined one or more quality of service parameters to the identified application. In an embodiment, the method further assigns (250) a dedicated bearer to the identified application and either does not schedule (260) the dedicated bearer at all or schedules (270) the dedicated bearer less frequently compared to a frequency of scheduling a default bearer.

16 Claims, 3 Drawing Sheets

METHOD AND APPARATUS FOR INCREASING PERFORMANCE OF A WIRELESS COMMUNICATION SYSTEM

FIELD OF THE DISCLOSURE

The present disclosure relates generally to wireless communication systems, and more particularly to a method and apparatus for increasing overall performance of a wireless communication system by providing worse than best effort quality of service.

BACKGROUND

In a wireless communication system, various wireless communication devices communicate with each other over an air interface of the wireless system. Nowadays the wireless communication devices are getting smarter and may also include capabilities of a personal computer. Therefore, the wireless network is increasingly used for a transfer of data.

Often, users of the wireless communication devices are not aware of capacity constraints of the wireless system and may send an enormous amount of data through the system, increasing the amount of traffic in, and congestion of, the wireless communication system. Sometimes, users are not even fully aware of the amount of data that they are exchanging, for example, when the traffic may include data packets generated by various background tasks, such as application synchronization, e.g., emails, calendars, software updates and so on. Other traffic that users may send and be minimally aware of, and yet congest the system with, may include data from noisy applications (for example, SAP and SMB/NetBIOS), malware (worms, DDOS, spam, etc.), over-the-top applications (for example, Vonage, Skype, and bittorrent) and the like. Besides congesting the system, constant receiving, transmitting, and processing of such traffic consumes energy of a limited life power supply, such as a battery, of the wireless communication device. Moreover, using the air interface of the wireless system for this type of traffic and applications reduces the air interface available for the preferred applications and results in inefficient use of the system, impacting the overall performance of the wireless communication system.

Accordingly, there is a need for a method and apparatus for increasing performance of the wireless communication system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
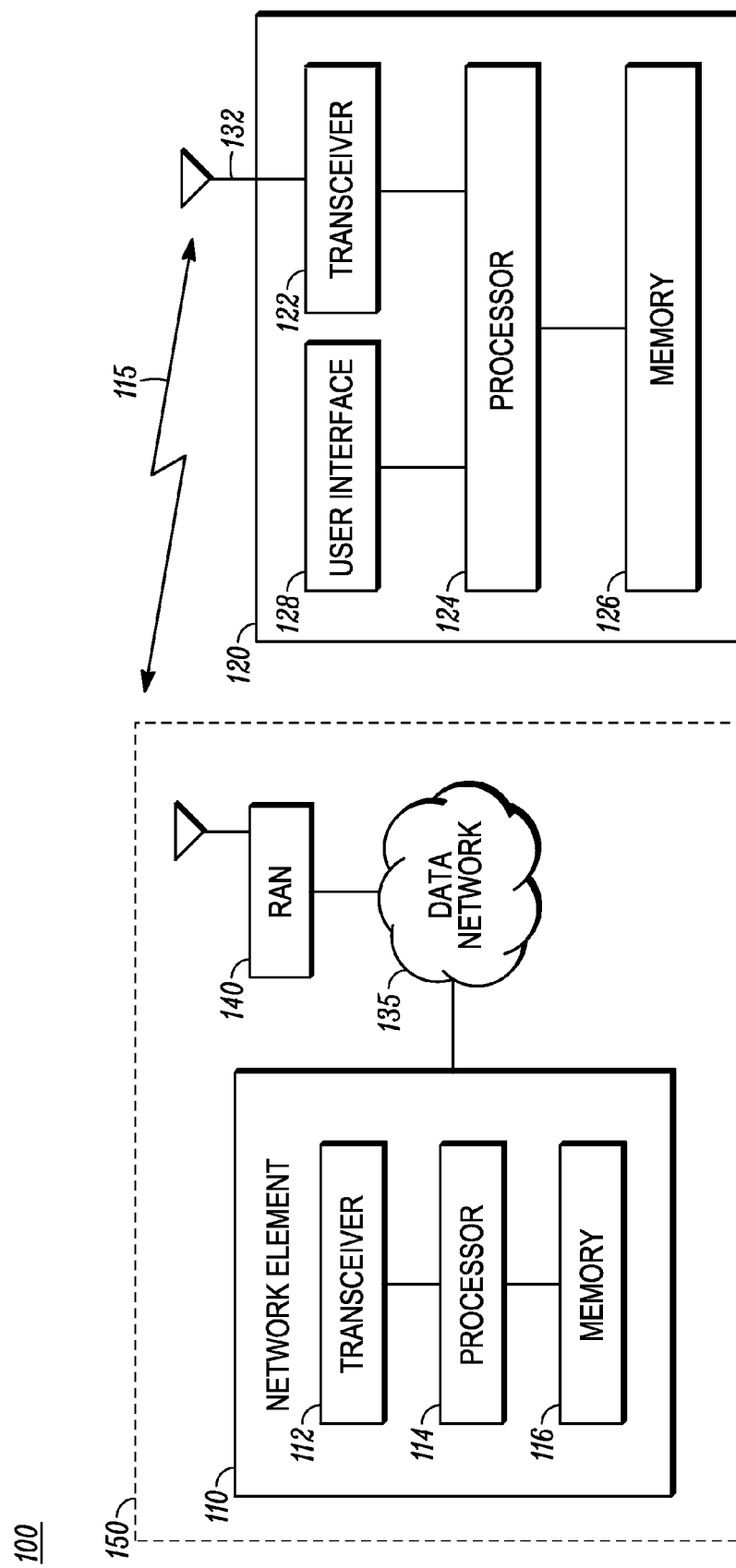
FIG. 1 is a block diagram of a wireless communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method for increasing performance of a wireless communication system is provided. The method includes determining quality of service parameters that will result in a reduced likelihood that an application assigned the determined quality of service parameters will be scheduled for transmission, identifying an application to be provided service that is less than best effort, and assigning the determined one or more quality of service parameters to the identified application. This results in a reduced likelihood that the identified application will be scheduled for transmission, thereby conserving network resources and increasing the performance of the wireless communication system. The above method can be implemented in a wireless communication device or in a network element.

FIG. 1 is a block diagram of a wireless communication system 100 in accordance with an embodiment of the present invention. Wireless communication system 100 comprises at least one wireless communication device 120 (one shown), for example, a cellular telephone, a smartphone, a radio telephone, a digital terminal equipment, a laptop computer, or a personal computer that supports wireless communications. In various technologies, wireless communication device 120 may be referred to as a mobile station, a user equipment, a subscriber unit, a user terminal, or an access terminal.

Wireless communication system 100 further comprises a wireless communication network 150 that includes one or more radio access networks 140 (one shown). The radio access network (RAN) 140 provides wireless communication services to the wireless communication device 120 via a radio link 115 having a forward link and a reverse link. The wireless network 150 further comprises a network element 110 in communication with the RAN 140 via a data network 135. As is apparent to one of ordinary skill in the art, wireless communication network 150 further includes multiple additional network elements, for example, a base station transceiver and a base station controller of the RAN, various gateways, authentication and billing nodes, support nodes, and application servers, that are not depicted herein so as not to obscure the disclosure with details that will be readily apparent to those of ordinary skill in the art having the benefit of the description herein.

The wireless communication device 120 includes a processor 124, such as one or more microprocessors, microcontrollers, digital signal processors (DSPs), combinations thereof or such other devices known to those having ordinary skill in the art. The particular operations/functions of processor 124, and thus of wireless communication device 120, are determined by an execution of software instructions and routines that are stored in a memory device 126 associated with the processor, such as random access memory (RAM), dynamic random access memory (DRAM), and/or read only memory (ROM) or equivalents thereof, that store data and programs that may be executed by the corresponding processor.

The wireless communication device 120 further includes a user interface 128 and a transceiver 122 that are coupled to the processor 124. In addition, the wireless communication device 120 includes an antenna 132 coupled to the transceiver 122. The user interface 128, for example, can include a microphone, an audio speaker, a display screen, a keyboard, and so on. The transceiver 122 comprises a transmitter and a receiver for sending data packets to, and receiving data packets from, wireless network 150 over the radio link 115.

In various embodiments of the present invention, the network element 110 may be located anywhere in the wireless network 150 that may be communicated with by RAN 140, or may be located in the RAN 140. The network element 110 may be a base station, an Access Service Network—Gateway, a policy manager, or a packet flow optimizer.

The network element 110 includes a transceiver 112 and an at least one memory device 116 that are each coupled to a processor 114. The transceiver 112 includes a receiver and a transmitter for receiving and transmitting data packets via data network 135. The processor 114, such as one or more microprocessors, microcontrollers, digital signal processors (DSPs), combinations thereof or such other devices known to those having ordinary skill in the art, is responsible for the processing of data in the network element 110. The at least one memory device 116 stores data and instructions that are executed by the processor 114 and permits a functioning of the network element 110 in the wireless communication system 100. Unless otherwise specified herein, the functions described herein as being performed by each of the network element 110 and the wireless communication device 120 are performed by the processor 114, 124 of the network element 110 and the wireless communication device 120.

In one embodiment of the present invention, network element 110 determines that the network element 110 is receiving undesirable traffic via radio link 115 and RAN 140. The undesirable traffic may be arbitrarily defined by an operator or administrator of the wireless communication network 150. Different operators may consider different types of traffic as undesirable. Moreover, an operator may consider different types of traffic as undesirable at different times. The undesirable traffic may include, for example, data packets from various background tasks, such as application synchronization tasks, e.g., for emails, calendars, software updates, and so on. By way of other examples, the undesirable traffic may include data from noisy applications (such as SAP, SMB/NetBIOS, etc.), malware (worms, DDOS, spam, etc.), and over-the-top applications (such as Vonage, Skype, bittorrent), to name a few possible undesirable applications.

In one example, the network element 110 may determine that it is receiving undesirable traffic by examining a source address and a destination address of packets constituting the undesirable traffic and received by the network element 110. In another example, the network element 110 may include Traffic Flow Templates (TFTs) and/or filters that help the network element 110 to discriminate the undesired traffic from the rest of the traffic.

In yet another example, the network element 110 may determine that it is receiving undesirable traffic based on a signature of a received data packet. Signatures are data patterns within packets that can be matched against known data patterns. The network element 110 is aware of different applications associated with the known data patterns. As a result, the network element 110 is aware of the known data patterns that are associated with applications that result in undesirable traffic and the known data patterns that are associated with applications that result in preferred traffic. Therefore, in this example, the network element 110 may compare the known data patterns with the signature of the received data packet.

Subsequently, the network element 110 may determine that the received data packet belongs to the category of undesirable traffic, if a match is found between the signature of the received data packet and the known data pattern that is associated with application resulting in undesirable traffic. Moreover, the network element 110 may also use the above compare and match results to determine that the received data packet belongs to the category of preferred traffic, if a match is found between the signature of the received data packet and the known data pattern that is associated with application resulting in preferred traffic. Subsequently, the network element 110 may give higher priority to preferred traffic. In one example, the network element 110 may give higher priority by putting the data packets of the preferred traffic in higher priority queue. In another example, the network element 110 may give higher priority by marking a quality of service parameter of the received data packets, such that all the subsequent wireless communication devices receiving the marked data packet will also treat the data packet with higher priority.

Subsequent to determining that the network element 110 is receiving undesirable traffic, the network element 110 determines one or more quality of service (QoS) parameters such that an application assigned these QoS parameters has a reduced likelihood that this application will be scheduled for transmission compared to a likelihood of scheduling another application for transmission that results in a preferred traffic (for example, voice calls). The preferred traffic is arbitrarily defined by an operator or administrator of the wireless communication network 150. Different operators may consider different types of traffic as preferred. Moreover, a same operator may consider different types of traffic as undesirable at different times. The network element 110 identifies at least a portion of an application to be provided service that is less than best effort (that is, an undesirable application or portion of an application). For example, when an email application is running on the wireless communication device 120, the network element 110 may identify particular features or portions of the email application that are to be provided service that is less than best effort, such as an address book synchronization. So, in this case the identified application is address book synchronization. By way of another example, the application to be provided service that is less than best effort may be an application that performs constant polling for new emails from the wireless communication device 120 to the network element 110. The network element 110 further assigns the determined quality of service parameters to this identified application or portion of an application.

In one embodiment of the present invention, the network element 110 further allocates a dedicated traffic bearer to the identified application or portion of an application and informs or instructs the wireless communication device 120, via RAN 140 and radio link 115, to use the dedicated bearer for data transfers between the wireless communication device 120 and the RAN 140, associated with the identified application or portion of an application. As used herein, references to a 'bearer' or a 'dedicated bearer' are meant to refer to a dedicated traffic bearer. The network element 110 can assign a number of different bearers to the wireless communication device 120 for different applications.

The transceiver 122 of the wireless communication device 120 receives the information identifying the dedicated bearer and the identified application or portion of an application, and the processor 124 stores the received information in the memory 126. In addition, the processor 124 assigns the dedicated bearer for the identified application or portion of an application. In other words, the network element 110 assigns the dedicated bearer to the identified application or portion of an application by providing the information regarding the dedicated bearer and the identified application or portion of an application to the wireless communication device 120, which then associates, or assigns, the identified dedicated bearer with the identified application or portion of an application. The dedicated bearer may be a WiMAX bearer, an Evolved Packet System (EPS) bearer, or any other air interface bearer whose scheduling may be controlled by the network element 110.

In one embodiment of the present invention, the processor 114 of the network element 110 does not schedule the dedicated bearer at all after assigning the dedicated bearer to the identified application or portion of an application. By not scheduling the dedicated bearer assigned to the identified application or portion of an application, undesirable traffic associated with the identified application is barred from use of the resources of the wireless network 150.

In another embodiment of the present invention, the network element 110 schedules the dedicated bearer less frequently than a frequency with which the network element 110 schedules a default bearer. The default bearer may be any bearer over the air interface that is utilized for carrying preferred traffic (for example, voice calls). In other words, the preferred traffic will be scheduled according to the normal scheduling rules. However, the undesired traffic will be less frequently scheduled than a frequency with which the preferred, that is, non-undesirable, traffic is scheduled. By less frequently scheduling the dedicated bearer assigned to the identified application or portion of an application as opposed to the rate at which default bearers are scheduled, a less than best effort service is provided to the identified application or portion of an application. This results in a decreased usage of the resources of the wireless network 150 by undesirable traffic associated with the identified application.

In yet another embodiment of the present invention, network element 110 sends a policy to the wireless communication device 120, via RAN 140 and radio link 115, to discard packets related to the identified application or portion of an application. The transceiver 122 of the wireless communication device 120 receives the policy and the processor 124 stores the policy in the memory 126. In response to receiving the policy, the wireless communication device 120 performs the instructions specified by the policy. For example, the policy may be based on a battery energy level status of the wireless communication device 120. In such an instance, the policy may comprise an instruction to discard packets related to the identified application or portion of an application when the battery energy level of the wireless communication device 120 is below a pre-determined threshold. By discarding the data packets associated with the identified application or portion of an application at the wireless communication device 120 in accordance to the policy, the resources of the wireless network 150 are never utilized for the undesirable traffic of the identified application or portion of an application.

In another embodiment of the present invention, the wireless communication device 120 may determine that it is receiving or transmitting undesirable traffic via RAN 140 and radio link 115. In one example, the wireless communication device 120 may determine that it is receiving or transmitting undesirable traffic by examining a source address or a destination address of packets constituting the undesirable traffic and received by the wireless communication device. In another example, the wireless communication device 120 may determine that it is receiving undesirable traffic based on a signature of a received data packet. Subsequent to determining that the wireless communication device 120 is receiving or transmitting undesired traffic, the wireless communication device 120 determines one or more quality of service (QoS) parameters such that an application assigned these QoS parameters has a reduced likelihood compared to a likelihood of scheduling another application for transmission that results in a preferred traffic (for example, voice calls). The wireless communication device 120 identifies applications that are to be provided service that is less than best effort and assigns the determined quality of service parameters to the identified application. The processor 124 of the wireless communication device 120 then stores a list of these identified applications in the memory 126 of the wireless communication device 120.

In one embodiment of the present invention, subsequent to identifying an application (or portion of an application) that is to be provided service that is less than best effort, that is, an undesirable application, the wireless communication device 120 transmits, to the network element 110 via transceiver 122, a request for assignment of a dedicated bearer to the identified application. In response to receiving the request, the network element 110 may assign, but not schedule, a dedicated bearer or may assign a dedicated bearer but schedule the dedicated bearer less frequently than the network element 110 schedules a default bearer.

In another embodiment of the present invention, after assigning the QoS parameters to the identified application (or portion of an application), the wireless communication device 120 may not even request an assignment of a dedicated bearer. Instead, the wireless communication device 120 may simply discard all the packets related to the identified application.

By assigning a dedicated bearer to an identified application (or portion of an application) that is associated with undesirable traffic, and subsequently not scheduling, or less frequently scheduling, the dedicated bearer, usage of the system resources (such as the air interface) by the undesirable traffic is reduced and system capacity is preserved, improving the performance of the wireless communication system. Moreover, discarding of packets related to the identified application at the wireless communication device 120 helps preserve the battery energy of the wireless communication device as a result of not processing, receiving, or transmitting those packets.

Figure 2:
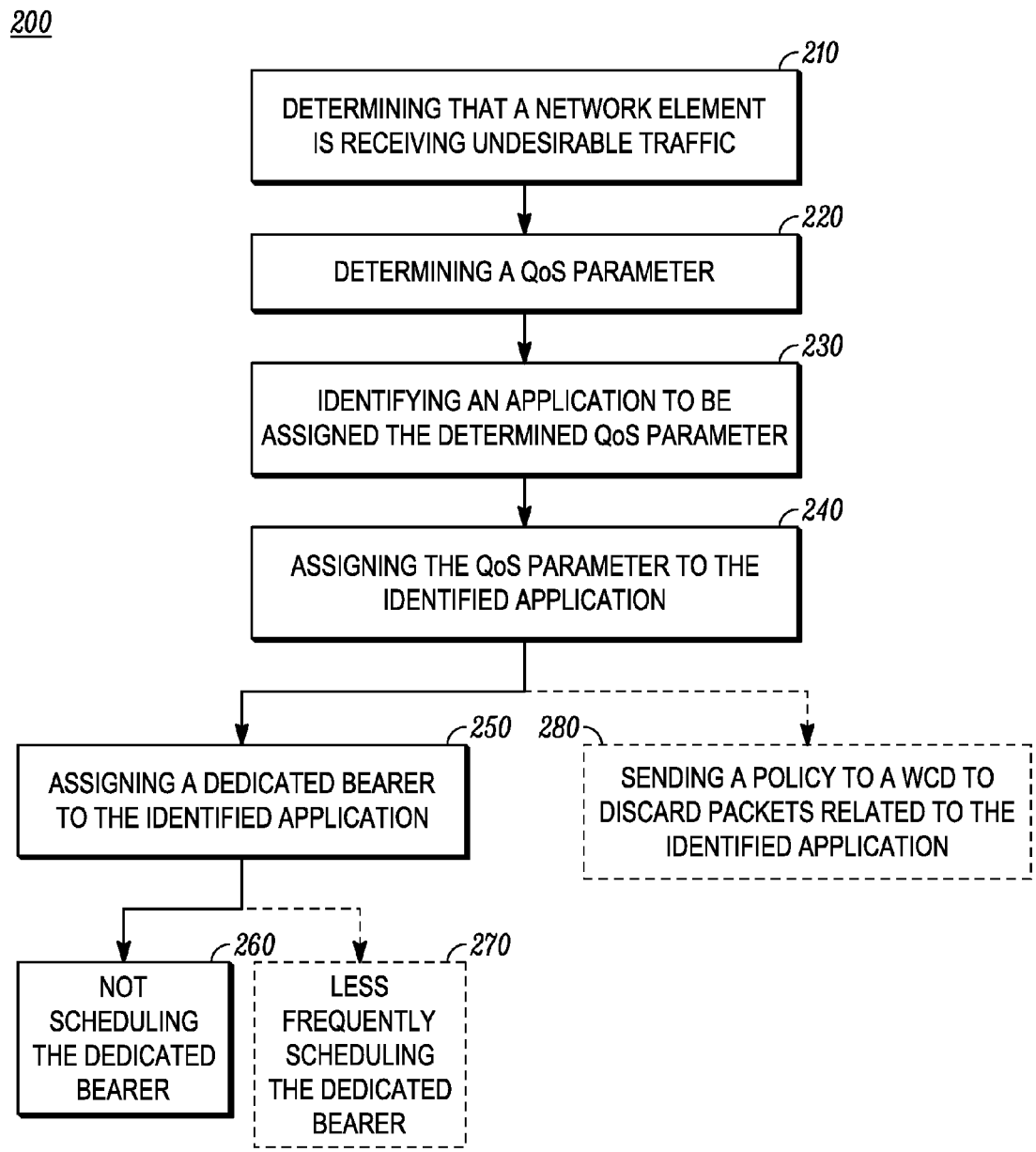
FIG. 2 is a flowchart of a method for a network element to increase performance of a wireless communication system in accordance with some embodiments.

FIG. 2 is a flowchart of a method 200 executed by the network element 110 to increase performance of the wireless communication system 100 in accordance with an embodiment of the present invention. The method 200 starts when the network element 110 determines 210 that it is receiving undesirable traffic. For example, the network element 110 may determine that it is receiving undesirable traffic by examining a source address and a destination address of the packets constituting the undesirable traffic. By way of another example, the network element 110 may determine that it is receiving undesirable traffic based on the signature of a data packet associated with the undesirable traffic. The undesirable traffic may include, for example, data packets from various background tasks, such as an application synchronization task, e.g., for emails, calendars, software updates and so on. By way of other examples, the undesirable traffic may include data packets from noisy applications (such as SAP, SMB/NetBIOS, etc.), malware (worms, DDOS, spam, etc.), or over-the-top applications (such as Vonage, Skype, bittorrent), to name a few possible undesirable applications.

In response to determining that the network element 110 is receiving undesirable traffic, the network element 110 determines 220 one or more quality of service (QoS) parameters such that an application assigned these QoS parameters has a reduced likelihood that the application will be scheduled for transmission. The network element 110 identifies 230 at least a portion of an application to be provided service that is less than best effort (that is, an undesirable application or portion of an application). For example, when an email application is running on the wireless communication device 120, the network element 110 may identify features of the email application, such as constant polling for new emails by the wireless communication device 120 to the network element 110. After identifying the at least a portion of an application to be provided service that is less than best effort, the network element 110 assigns 240 the determined quality of service parameters to the identified application. The identified application may be a complete application or a portion of the application that results in the undesirable traffic in the wireless communication system.

In one embodiment of the present invention, the network element 110 further assigns 250 a dedicated bearer to the identified application, for example, by assigning a dedicated bearer to the wireless communication device 120 to use for the identified application. The network element 110 can assign a number of different bearers to the wireless communication device 120 for different applications. The dedicated bearer may be a WiMAX bearer, an Evolved Packet System (EPS) bearer, or any other air interface bearer whose scheduling may be controlled by the network element 110.

In a first case, after assigning the dedicated bearer to the identified application, the network element 110 does not schedule 260 the dedicated bearer at all. By not scheduling 260 the dedicated bearer assigned to the identified application, the undesirable traffic associated with the identified application is barred from use of the resources of the wireless system 100.

In a second case, after assigning the dedicated bearer to the identified application, the network element 110 schedules 270 the dedicated bearer less frequently than a frequency with which the network element schedules a default bearer. The default bearer may be any bearer over the air interface that is utilized for carrying preferred traffic (for example, voice calls). By less frequently scheduling 270 the dedicated bearer assigned to the identified application as compared to a rate at which default bearers are scheduled, a less than best effort service is provided to the identified applications. This results in a decreased usage of the resources of the wireless system 100 by undesirable traffic associated with the identified application.

In another embodiment of the present invention, after assigning the QOS parameters to the identified application at step 240, the network element 110 sends 280 a policy to the wireless communication device 120 to discard data packets related to the identified application. In one example, the policy may instruct the wireless communication device 120 to discard packets related to the identified application only during peak traffic hours (for example, 6 pm to 10 pm). By discarding the data packets associated with the identified application, at the wireless communication device 120, the resources of the wireless network are never utilized for this undesirable traffic. Specifically, in the above example, discarding the data packets based on the policy during the peak hours, results in decreasing overall traffic during the peak hours and may subsequently reduce latency in the wireless communication system during the peak hours. Discarding packets at the wireless communication device 120 also helps in saving the battery energy of the wireless communication device 120, as the wireless communication device 120 does not need to transmit or process these packets associated with the identified application continuously.

Figure 3:
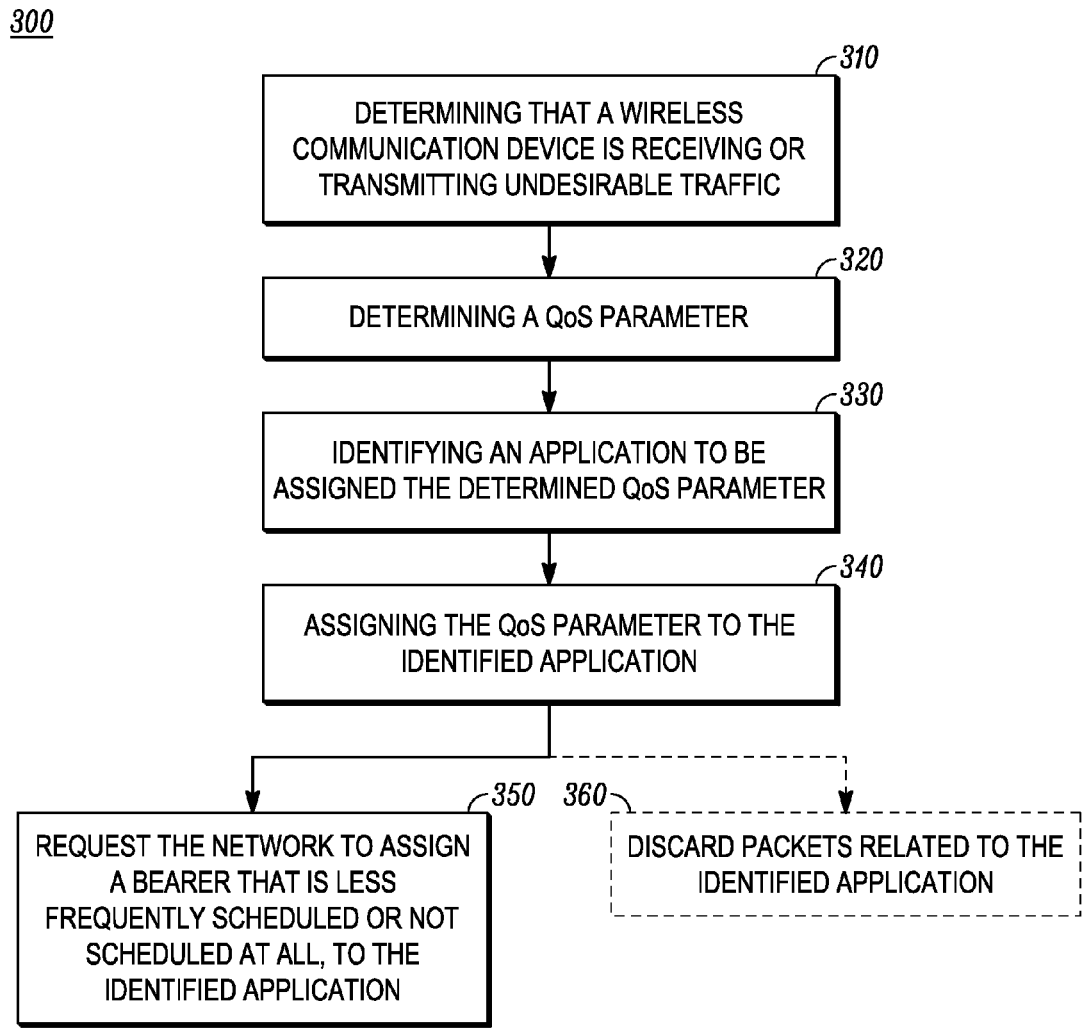
FIG. 3 is a flowchart of a method for a wireless communication device to increase performance of a wireless communication system in accordance with some embodiments.

FIG. 3 is a flowchart of a method 300 executed by the wireless communication device 120 to increase performance of the wireless communication system 100 in accordance with an embodiment of the present invention. The method 300 starts when the wireless communication device 120 determines 310 that it is receiving or transmitting undesirable traffic. For example, wireless communication device 120 may determine 310 that it is receiving or transmitting undesirable traffic by examining a source address or a destination address of the packets constituting the undesirable traffic. By way of another example, the wireless communication device 120 may determine 310 that it is receiving undesirable traffic based on a signature of a data packet associated with the undesirable traffic.

In response to determining 310 that the wireless communication device 120 is receiving or transmitting undesirable traffic, the wireless communication device 120 determines 320 one or more quality of service (QoS) parameters such that an application assigned these QoS parameters has a reduced likelihood that the application will be scheduled for transmission compared to a likelihood of scheduling another application for transmission that results in a preferred traffic (for example, voice calls). The wireless communication device 120 identifies 330 an application or a portion of an application that is to be provided service that is less than best effort. After identifying the application or portion of an application that is to be provided service that is less than best effort, the wireless communication device 120 assigns 340 the determined quality of service parameters to the identified application.

In one embodiment of the present invention, subsequent to assigning the determined quality of service parameters to the identified application, the wireless communication device 120 requests 350 the network element 110 for assignment of a dedicated bearer. In response to receiving the request, the network element 110 may assign, but not schedule, a dedicated bearer or may assign a dedicated bearer but schedule the dedicated bearer less frequently than the network element 110 schedules a default bearer. Therefore, the usage of the network resources (such as, the air interface) by the undesirable traffic is reduced by assigning a dedicated bearer to the identified applications that results in the undesirable traffic over the wireless network and subsequently, not scheduling or less frequently scheduling the dedicated bearer. This decreases the inefficient use of the resources of the wireless network, subsequently, improving the performance of the wireless communication system.

In another embodiment of the present invention, after assigning 340 the QoS parameters to the identified application, the wireless communication device 120 may not even request an assignment of a dedicated bearer. Instead, the wireless communication device 120 simply discards 360 the data packets related to the identified application. By discarding packets related to the identified application, the wireless communication device 120 saves battery energy level of the wireless communication device 120 that would have otherwise used for processing, receiving, or transmitting the packets associated with the identified application.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A method to increase performance of a wireless communication system, the method comprising:
   determining one or more quality of service parameters that will result in a reduced likelihood that an application assigned the one or more quality of service parameters will be scheduled for transmission;
   identifying an application to be provided service that is less than best effort:
   assigning the determined one or more quality of service parameters to the identified application, wherein assigning the determined one or more quality of service parameters comprises assigning a dedicated bearer to the identified application; and
   subsequent to assigning the dedicated bearer to the identified application,
   not scheduling the dedicated bearer.

2. The method of claim 1, wherein the dedicated bearer is at least one of an Evolved Packet System (EPS) bearer and a WiMAX bearer.

3. The method of claim 1 wherein the identified application is associated with a mobile station, and wherein assigning the dedicated bearer to the identified application comprises assigning the dedicated bearer to the mobile station.

4. The method of claim 3, wherein assigning the dedicated bearer to the mobile station comprises:
   allocating, by a network element, the dedicated bearer for applications that are to be provided service that is less than best effort; and
   instructing a mobile station, by the network element, to use the allocated dedicated bearer for applications that are to be provided service that is less than best effort.

5. The method of claim 4, wherein assigning the dedicated bearer to the mobile station comprises:
   allocating, by the network element, the dedicated bearer for applications that are to be provided service that is less than best effort;
   informing the mobile station of the dedicated bearer; and
   assigning, by the mobile station, the dedicated bearer for the identified application.

6. The method of claim 1, wherein assigning the determined one or more quality of service parameters comprises sending a policy to a mobile station and wherein the policy informs the mobile station to discard packets related to the identified application.

7. The method of claim 1, wherein assigning the determined one or more quality of service parameters comprises requesting a network element to assign the dedicated bearer to the identified application.

8. The method of claim 1, wherein assigning the determined one or more quality of service parameters comprises discarding packets related to the identified application.

9. The method of claim 1, wherein the identified application comprises one or more of background task, a noisy application, malware, or an over-the-top application.

10. An apparatus comprising:
a network element having a processor that is configured to determine one or more quality of service parameters that will result in a reduced likelihood that an application assigned the one or more quality of service parameters will be scheduled for transmission, identify an application to be provided service that is less than best effort, assign the determined one or more quality of service parameters to the identified application, assign a dedicated bearer to the identified application, and subsequent to assigning the dedicated bearer to the identified application,
not schedule the dedicated bearer.

11. The apparatus of claim 10, wherein the identified application is associated with a mobile station.

12. The apparatus of claim 10, wherein the processor is configured to sends a policy to a mobile station, wherein the policy informs the mobile station to discard packets related to the identified application.

13. The apparatus of claim 12, wherein the network element comprises one or more of a base station, an Access Service Network-Gateway, a policy manager, and a packet flow optimizer.

14. An apparatus for scheduling bearer traffic comprising:
a mobile station having a processor that is configured to determine one or more quality of service parameters that will result in a reduced likelihood that an application assigned the one or more quality of service parameters will be scheduled for transmission, identify an application to be provided service that is less than best effort, assign the determined one or more quality of service parameters to the identified application, transmit a request for assignment of a dedicated bearer, and in response to transmitting the request, receive an assignment of a dedicated bearer that is less frequently scheduled than a default bearer or is not scheduled at all.

15. The apparatus of claim 14, wherein the apparatus further comprises a network element and wherein the network element is configured to assign the dedicated bearer to the identified application upon receiving the request from the mobile station, schedule the dedicated bearer, and schedule the default bearer.

16. The apparatus of claim 14, wherein the mobile station processor is configured to discard packets related to the identified application.

* * * * *